Oct. 30, 1951   H. GANG   2,572,920
OPERATION CONTROL MEANS
Filed Feb. 11, 1949   7 Sheets-Sheet 7
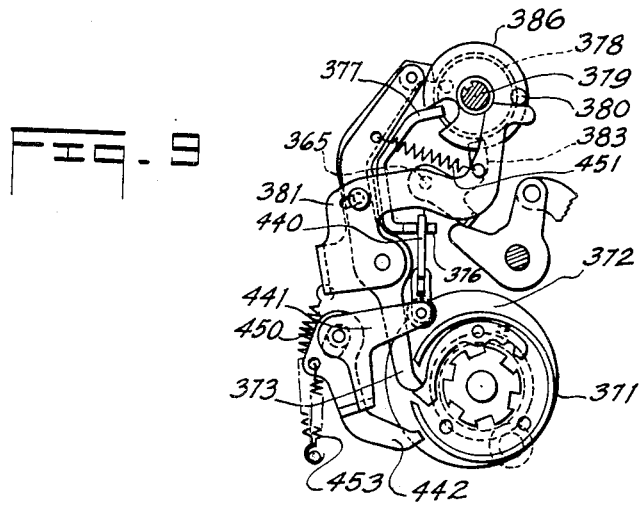
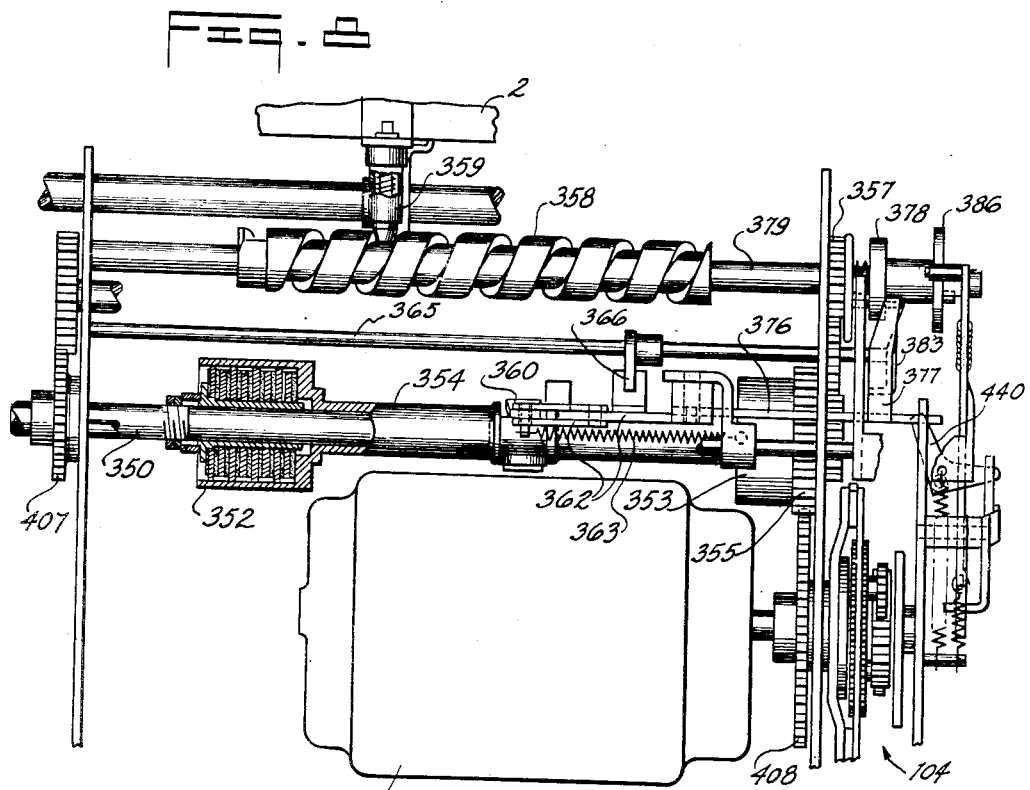
INVENTOR
HERMAN GANG
BY George V. Hall
ATTORNEY Patented Oct. 30, 1951

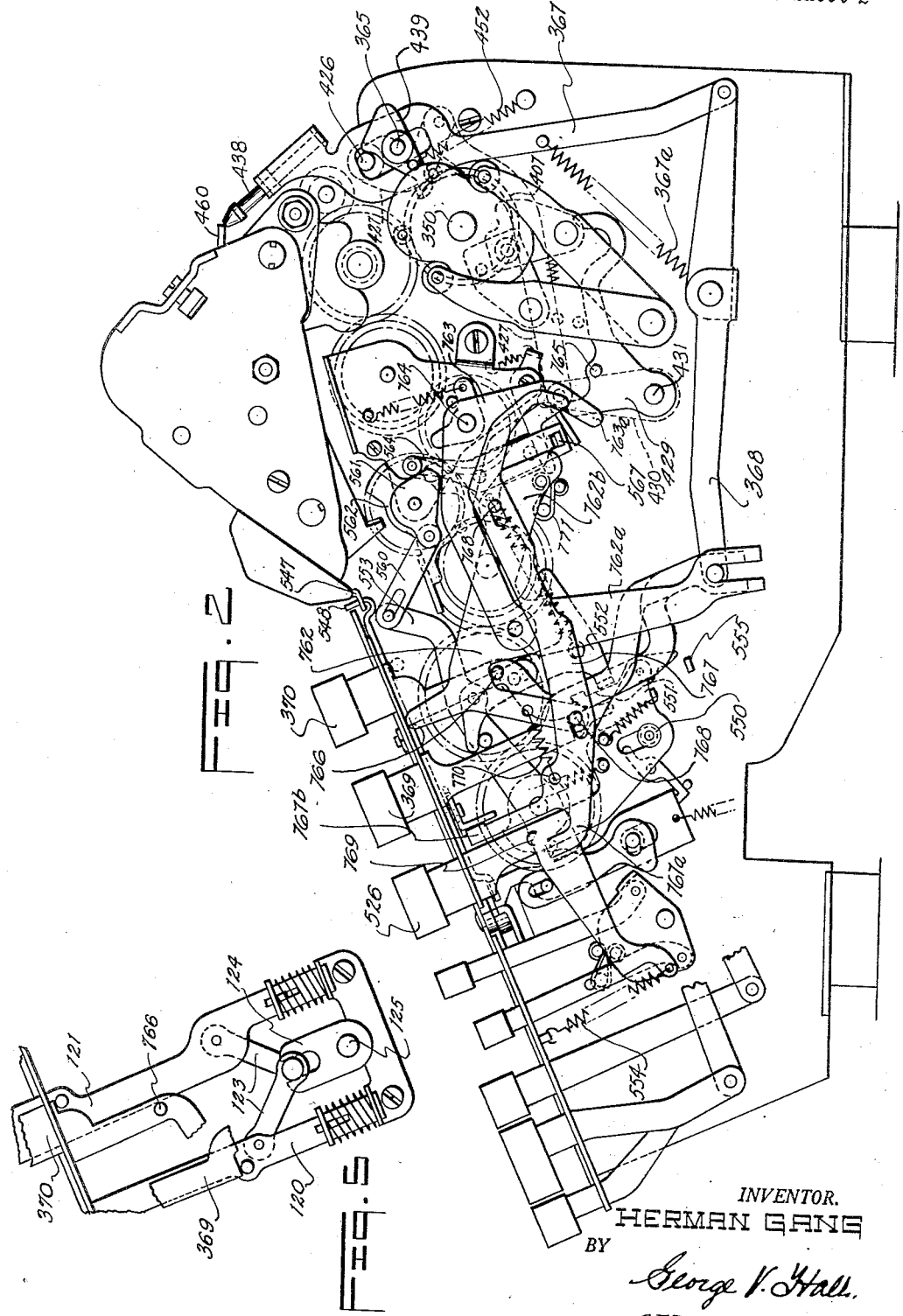

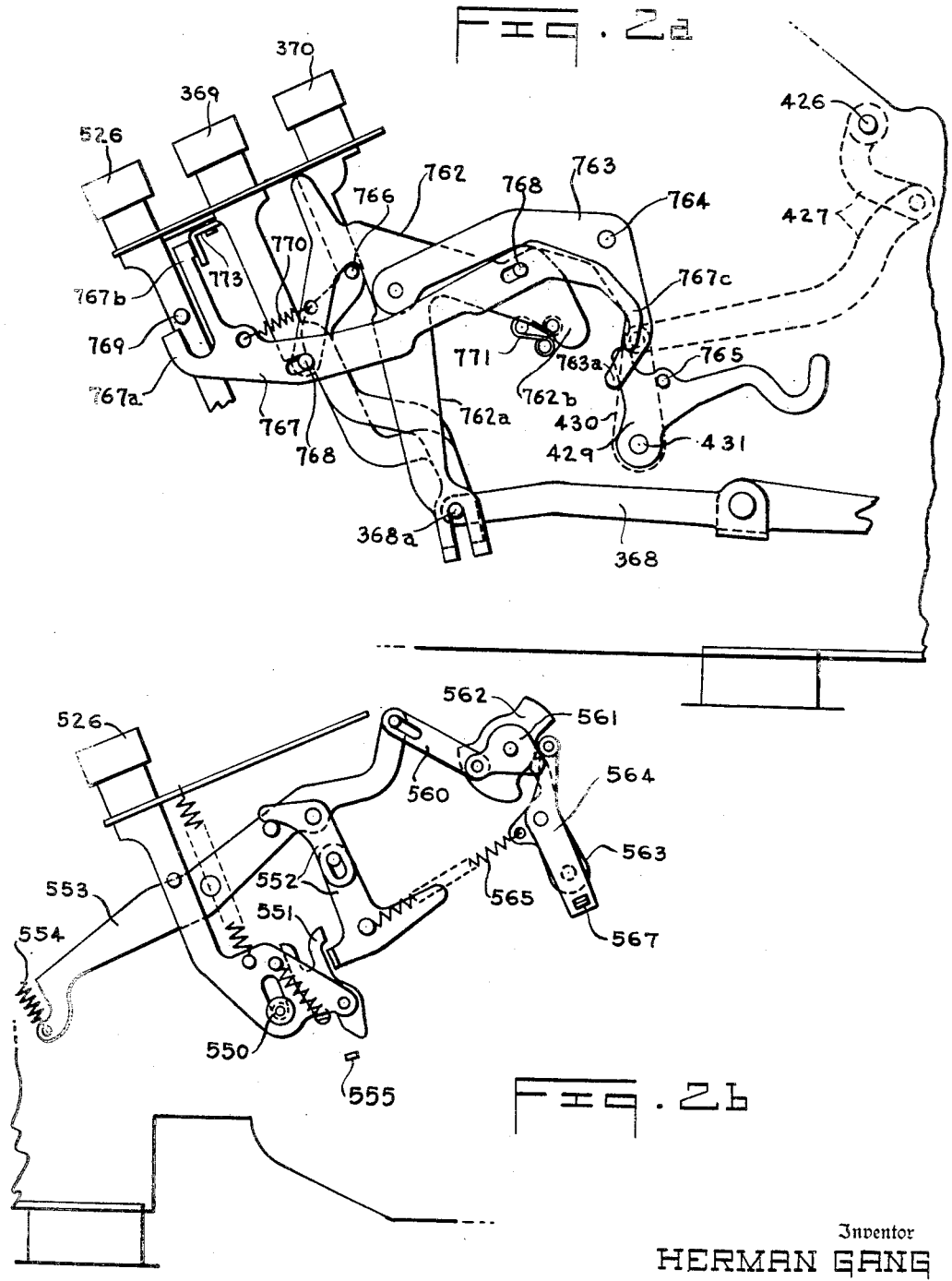

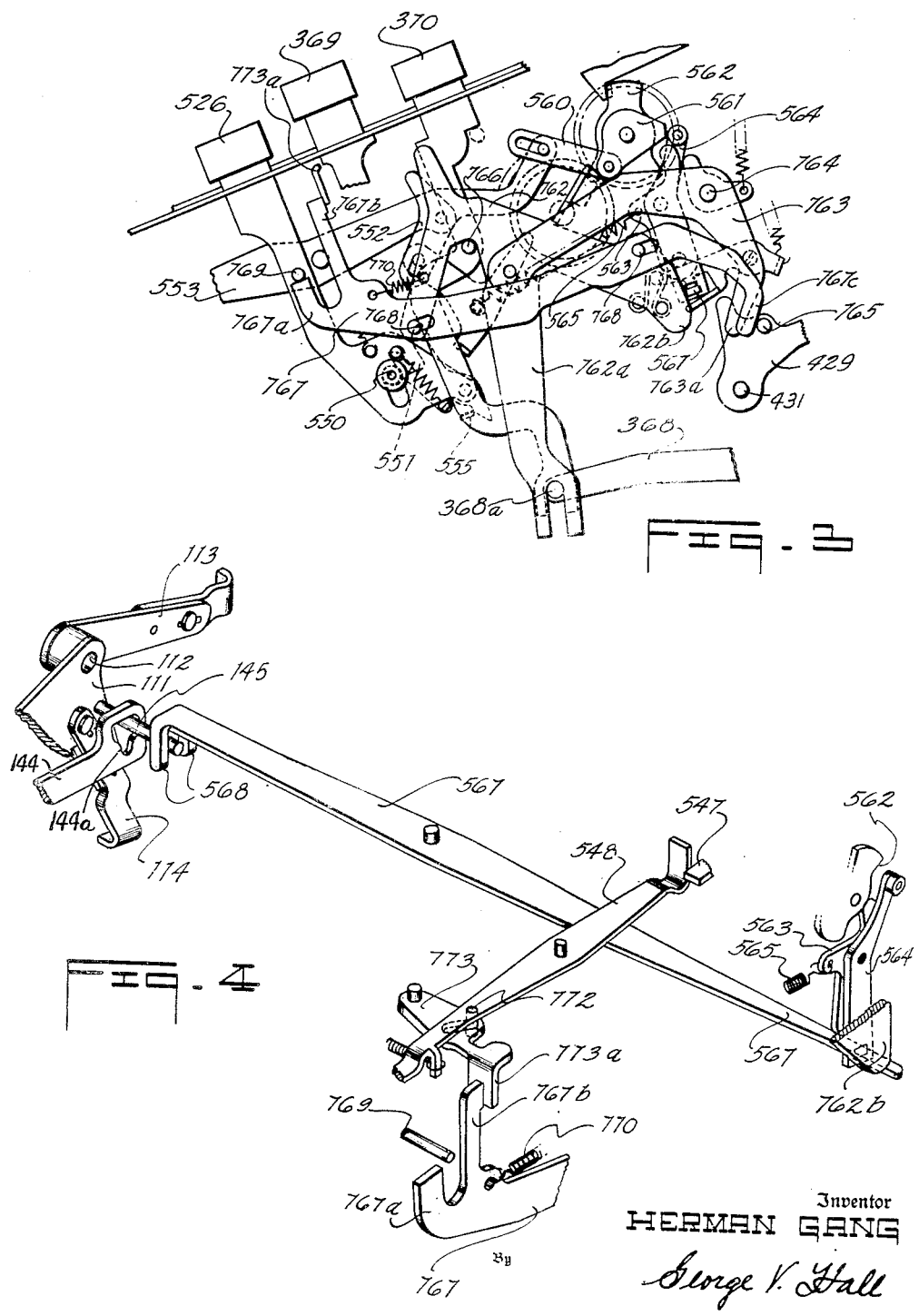

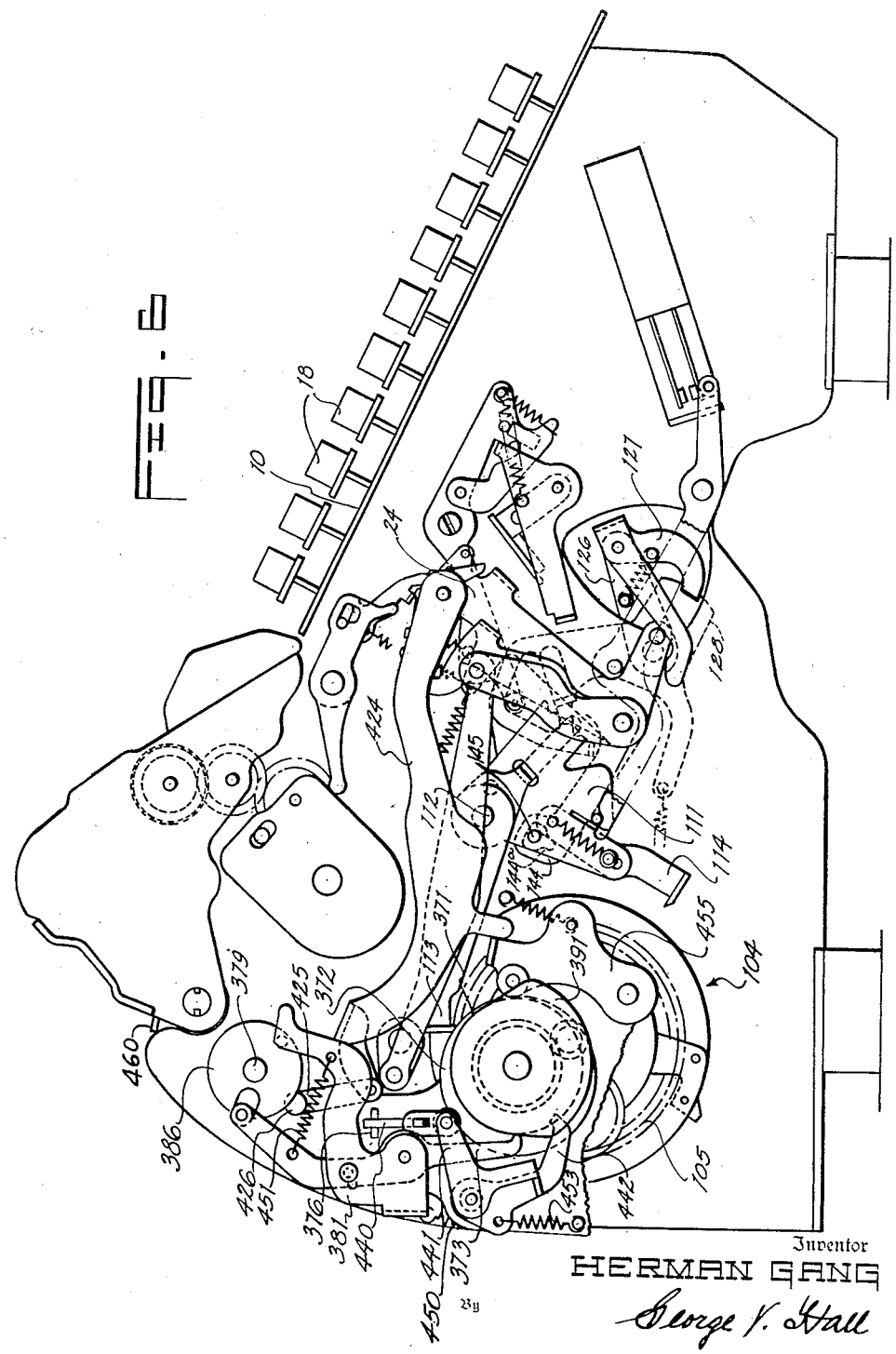

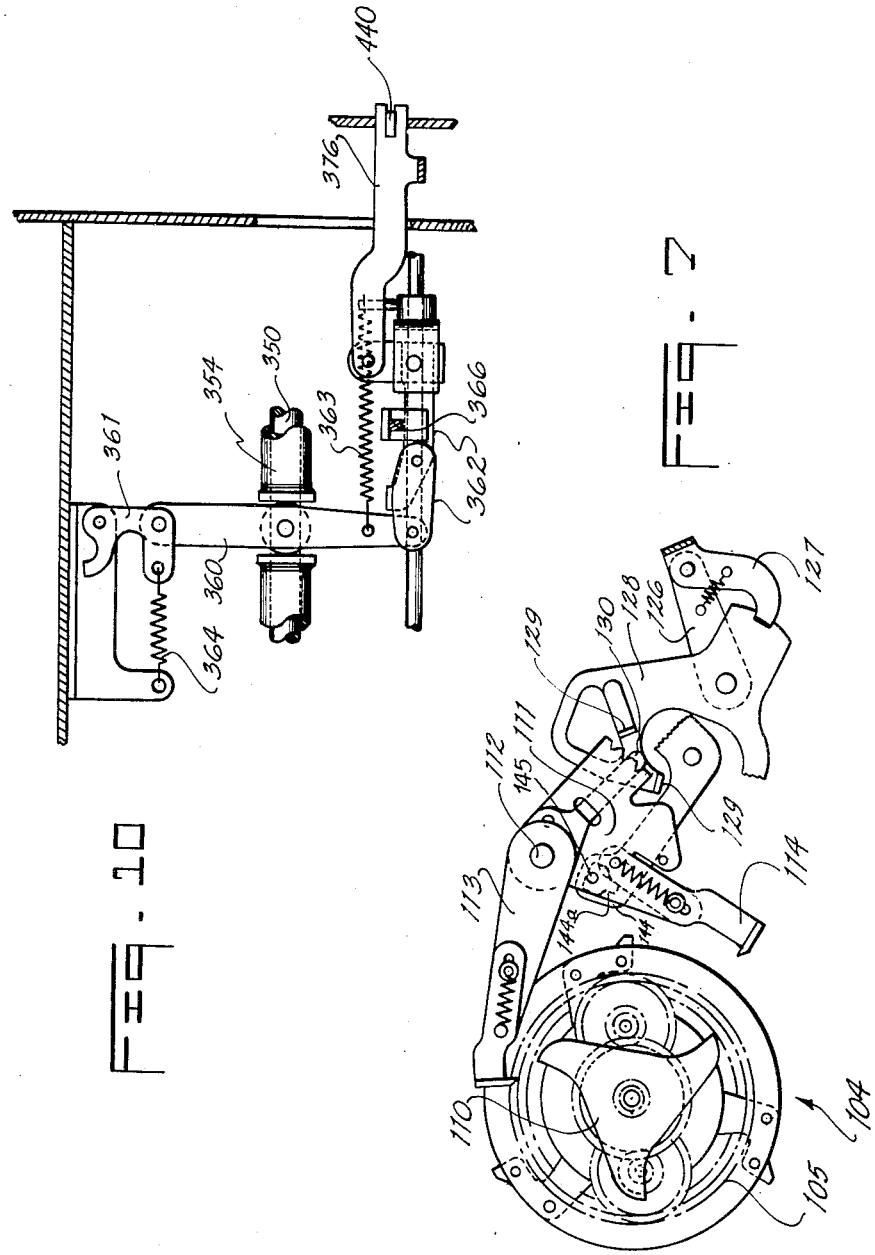

2,572,920

UNITED STATES PATENT OFFICE 2,572,920

OPERATION CONTROL MEANS

Herman Gang, Livingston, N. J., assignor to Monroe Calculating Machine Company, Orange, N. J., a corporation of Delaware Application February 11, 1949, Serial No. 75,955

11 Claims. (Cl. 235—63)

The invention relates to operation control means for calculating machines and the like, and more particularly to a novel arrangement of such control means whereby a plurality of clutch driven mechanisms may be sequentially operated or one of such mechanisms individually operated in response to the single movement of an operating member such as a key; the sequential or individual operation being selectively determined by the position of a shiftable register carriage.

In the performance of certain calculations on particular forms of calculating machines, it is desirable or necessary to position the shiftable carriage in a given position prior to the institution of the calculation. Furthermore, in certain of such machines, it is necessary that the carriage be so positioned before the factors involving the calculation can be set in the machine. For example, in the machine fully disclosed in my co-pending application Serial No. 8,547 (now Patent 2,531,206), a multiplier may be set in a series of storage devices only when the carriage is in its leftmost position; in which position a program of multiplication may then be initiated in accordance with the operation fully disclosed in my co-pending application Serial No. 8,548 (now Patent 2,531,207).

In the specific application of the invention as herein disclosed, means are provided which in response to the single movement of a key or operating member, will cause the carriage to be shifted to a given position if displaced therefrom, and a multiplier set-up operation sequentially initiated. If, however, the carriage is in the given position, the set-up operation will be initiated forthwith; carriage position devices being so adjusted as to render the operating key ineffective to initiate operation of the carriage shifting mechanism. The invention in its broad aspects, however, is particularly adaptable to calculating machines wherein it is necessary or desirable to institute a particular clutch driven operation with the shiftable carriage in a given position. It will readily be understood, therefore, that the invention resides in the control of the initiation of clutch driven operations in conjunction with carriage position devices and that the particular operation initiated has no relationship to the invention per se. The invention, however, will best be understood from the following description when read in conjunction with the accompanying drawings wherein:

Fig. 2 is a right side elevation of the machine showing the control devices in normal position and associated with multiplier set-up and carriage shift initiating mechanisms;

Fig. 2a is a fragmentary right side elevation more clearly illustrating the control devices and carriage shift initiating mechanisms shown in Fig. 2;

Fig. 2b is a fragmentary right side elevation more clearly illustrating the multiplier set-up initiating mechanisms shown in Fig. 2;

Fig. 3 is a fragmentary detailed side elevation of the control devices in an operated position and associated with certain of the mechanisms shown in Fig. 2;

Fig. 4 is a fragmentary perspective of portions of the control devices, adjusting means therefor and portions of the clutch engaging mechanisms;

Fig. 5 is a fragmentary elevation of certain parts associated with the carriage shift initiating mechanisms;

Fig. 6 is a left side elevation of the machine showing clutch mechanisms and operation initiating and terminating devices;

Fig. 7 is a detailed elevation of the differential clutch mechanism shown in Fig. 6;

Fig. 8 is an elevation and partial section of portions of the carriage shift and machine drive and control mechanisms therefor as viewed from the rear of the machine;

Fig. 9 is a detailed fragmentary left side elevation of portions of the carriage shift and machine drive control mechanisms;

Fig. 10 is a detailed plan view of the toggle linkage and associated parts controlling the engagement of the auxiliary clutches.

Differential clutch mechanism

Figure 1:
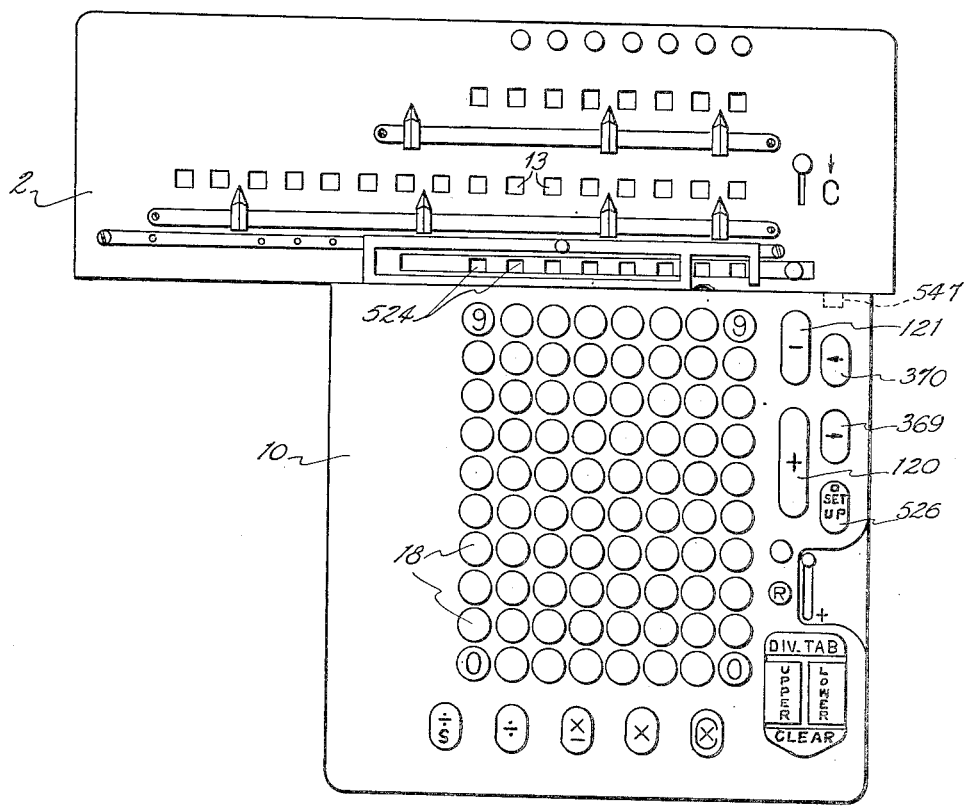
Fig. 1 is a plan view of a calculating machine embodying the invention.

In the embodiment of the invention herein disclosed, power from the motor 1 (Fig. 8) to drive the multiplier setup mechanism is transmitted through a drive train comprising a selectively engageable differential clutch mechanism 104 (Figs. 6, 7 and 8) and a normally engaged first auxiliary clutch 352 (Fig. 8). Alternatively, power to drive the carriage shifting mechanism is delivered through a drive train comprising the same differential clutch mechanism 104 and a normally disengaged second auxiliary clutch 353 which is engageable upon disengagement of the first auxiliary clutch 352.

The differential clutch mechanism 104 is constructed substantially in accordance with the disclosure of United States Patent 1,566,650 issued on December 22, 1925, to George C. Chase. Normally the gearing comprising both working legs of the differential drive rotate idly as described in the aforenoted patent; interruption of the movement of one leg causing the planet gears to move in their orbit in one direction accordingly rotating the output gear 408 (Fig. 8) and interruption of the movement of the other leg causing a movement in the opposite direction. The working legs of the differential drive are selectively arrested by means of a reversing clutch lever 111 (Figs. 4, 6 and 7) fulcrumed on the frame at 112, and adapted for neutral, additive and subtractive setting. Clockwise movement of lever 111 positions it to additive setting whereby a hook arm 114 of said lever will engage a lug upon gear 105 forming one leg of the differential drive to interrupt its movement thereby causing rotation of output gear 408. Conversely, counterclockwise movement positions the lever 111 to subtractive setting whereby a hook arm 113 thereof will engage a stop 110 of the other leg of the differential to interrupt its movement and cause rotation of output gear 408 in the reverse direction.

*Initiation of multiplier set-up operation*

As fully disclosed in my co-pending application Serial No. 8,547 (now Patent 2,531,206), values set on keys 18 (Fig. 1) of keyboard 10 are registered in a series of storage wheels 524 by an operation initiated upon depression of key 526 when carriage 2 is in its leftmost position. Upon depression of key 526, a spring energized mechanism is operated which, in addition to adjusting the set-up mechanism for operation, engages the differential clutch mechanism 104 for additive drive. The set-up operation is effected by drive to the actuators (not shown) of the machine; which drive is taken from a gear 407 (Fig. 8). Gear 407 is fast upon shaft 350 (Figs. 2 and 8) which is driven through friction clutch 352, the driving element of which is connected to the driving element of the second friction clutch 353 by a sleeve 354 so that they are rotated as a unit. The driving elements of the clutches 352 and 353 are connected to the output gear 408 of the differential clutch mechanism 104 by means of a gear 355 secured to the driving member of the clutch 353. Clutch 352 is normally engaged and clutch 353 disengaged. Clutch 352, however, is disengaged and clutch 353 engaged to complete the drive to a carriage shift worm 358 (Fig. 8) as will be hereinafter described.

As heretofore noted, the invention does not concern the particular clutch driven operation effected, but relates to control of the engagement of the clutch mechanisms by which power is transmitted from the motor 1 to drive the mechanism which performs the operation. It is therefore considered necessary only to describe the mechanisms which initiate the operation by engagement of clutch mechanism 104 upon depression of key 526.

The set-up key 526 (Figs. 1, 2, 2a, 2b and 3) is located at the right-hand side of the keyboard 10 and the key stem thereof is provided at its lower end with a slot through which extends a stud 550 which is mounted on the side frame. Normally, the set-up key 526 is held in its raised position by a suitable spring with the bottom of the slot against stud 550. The stem of the set-up key 526 is further provided at its lower end with a rightwardly extending arm having a trip member 551 pivotally mounted thereon as shown by dotted lines in the drawings. The trip member is normally biased clockwise by a spring attached to a lug thereof and a pin in the stem of key 526. The trip member 551 is provided with an upstanding hook portion which is normally positioned above and over a leftward extension of a lower link of a toggle 552, said lower link being pivotally mounted at its lower end to the machine framing. The upper link of toggle 552 is pivoted at its upper end to the right hand arm of a lever 553 which is pivotally mounted intermediate its ends on a stud in the side frame of the machine. When toggle 552 is set, the rearward end of lever 553 is held in normal raised position against the tension of a spring 554 (Figs. 2 and 2b) attached to its forward end thereby urging said lever in clockwise direction. Upon depression of key 526, the hook portion of member 551 is brought downwardly into contact with the leftward extension of the lower link of toggle 552, rocking said link counterclockwise to break the toggle. As the hook of trip member 551 is moved downwardly to brake the toggle, a cam edge of the downward extension of said trip member contacts a lug 555 (Fig. 3) on the machine frame, rocking trip member 551 counterclockwise against the tension of its spring. The hook of trip member 551 is thus removed from the path of movement of the leftward extension of the lower link of toggle 552 after having broken said toggle by contact therewith. This provides that toggle 552 may be reset while key 526 is held depressed as fully disclosed in my aforenoted co-pending application Serial No. 8,547.

When toggle 552 is broken, lever 553 is allowed to be rocked clockwise (Fig. 3) by spring 554 thereby moving its rearward end downwardly to furnish counterclockwise drive for a pair of cams 561 and 562 through pin and slot connection with a link 560 attached at a common point to the cams which are adapted for operation in connection with a lever 564 and an arm 563 respectively (Figs. 2, 2b, 3, and 4). Arm 563 is pivotally mounted at its lower end to the machine framing. The upper free end of arm 563 terminates in a nose which is urged counterclockwise into contact with cam 562 by a spring 565. Pivotally mounted on arm 563 intermediate its ends is a lever 564 which is provided at its upper end with a roller which is normally in contact with cam 561 (Figs. 2 and 2b). Upon counterclockwise movement of cams 561—562, arm 563 will not be moved from its normal position as the movement of cam 562 is not sufficient to bring the effective portion thereof into contact with the nose of said arm. The pivotal point of lever 564 will thus at this time be maintained in fixed position. In the performance of the set-up operation, however, arm 563 is rocked upon further movement of cam 562 which is effected following the initiation of the operation as fully disclosed in my aforenoted co-pending application Serial No. 8,547 (now Patent 2,531,206), which operation does not concern the present disclosure. Upon the initial counterclockwise movement of cam 561, however, lever 564 will be rocked in clockwise direction, from the position shown in Figs. 2 and 2b, to move clutch lever 111 to its additive position whereby engaging the drive for the set-up operation as follows:

Lever 564 is provided with a slot at its lower end (Figs. 2, 2b, 3, and 4) through which extends the rightmost end of a lever 567. Lever 567, which extends across the machine and is pivotally mounted intermediate its ends on a suitable bracket, is provided at its leftmost end with a pair of spaced ears 568 (Fig. 4). The ears 568 are normally positioned on either side of a pin 145 of clutch lever 111, said pin extending inwardly through a suitable opening in the left-hand side frame. Ears 568 are normally out of contact with pin 145 and are sufficiently spaced to allow clutch lever 111 to be moved to either active position without interference from said ears. However, when lever 567 is rocked in either direction, the movement is sufficient to cause either one or the other of ears 568 to contact pin 145 thus moving the clutch lever into either of its active positions. Upon clockwise movement therefore of lever 564 by cam 561, lever 567 will be rocked in clockwise direction (Fig. 4) thereby moving clutch lever 111 to additive position thus engaging the drive for the set-up operation.

*Carriage shifting mechanism*

The invention is shown as applied to a calculating machine employing the carriage shifting devices constructed in accordance with the disclosure of United States Patent 2,419,760, issued to Edwin F. Britten, Jr., on April 29, 1947, as modified by the disclosure of patent application Serial No. 8,548, filed February 16, 1948 (now Patent 2,531,207), by the present applicant.

The selectively engageable differential clutch mechanism 104 which as heretofore described determines the sign of registration is alternatively engageable to determine the direction of shift of the register carriage 2. This differential clutch mechanism is engaged under control of registration and shifting motor operation keys, and a coupling is provided in the train between said keys and the clutch mechanism to provide for stopping of the operation while a key is held manually depressed. Plus and minus bars are depressible to alternatively determine the engagement of the differential clutch mechanism by power from the motor 1 transmitted through the normally engaged auxiliary clutch 352 (Fig. 8). Associated with the plus and minus keys 120 and 121 (Figs. 1, 2, 3 and 5) are the right and left shift keys 369 and 370 respectively. The stems of the right and left shift keys are provided with shoulders which overlie pins in the stems of the plus and minus keys respectively, whereby the depression of a shift key results in the depression of the associated registration key to selectively engage the differential clutch mechanism. Furthermore in response to the depression of a shift key the auxiliary clutch 352 (Fig. 8) is disengaged and the auxiliary clutch 353 engaged to complete the drive to the shift worm 358.

The plus bar 120 and minus bar 121 are connected by links 123 (Fig. 5) with an arm 124 fast upon a rock shaft 125, this shaft extending across the machine and being provided at its left-hand end with an arm 126 (Figs. 6 and 7) having coupling connection 127 with a setting plate 128. Setting plate 128 is provided with opposed lugs 129 lying upon either side of a tooth 130 of clutch lever 111, so that depression of one of the bars 120, 121 will rock shaft 125, and through plate 128 will move clutch lever 111 from neutral position to engage the arm 113 or 114 with the related elements of the differential clutch mechanism.

The driving members of the auxiliary clutches 352 and 353 (Fig. 8) connected by the sleeve 354 are movable laterally to compress the friction disks of the normally engaged clutch 352 or the clutch 353 respectively. The driven element of clutch 353 is fast with a gear having intermediate gear connection with a gear 357 fast upon a worm shaft 379. Carriage shifting worm 358 is also fast on shaft 379, this worm being engaged by spring urged plunger 359 mounted on carriage 2. Normally, clutch 352 is held in engagement by a toggle linkage 362 (Figs. 8 and 10) this linkage being pivotally connected to one end of a lever 360, said lever being connected at its other end to the frame of the machine through a link 361, and being provided with anti-friction rollers engaging flanges of the sleeve 354. A spring 364 attached to the linkage 361 holds the clutch 352 engaged under spring tension. Upon breaking of the toggle 362 a spring 363 attached to lever 360 will shift the sleeve 354 toward the left (toward the right in Figs. 8 and 10) disengaging the clutch 352 and engaging the auxiliary shift clutch 353. Toggle 362 is broken upon depression of a shift key as follows:

An intermediately pivoted lever 368 (Figs. 2, 2a, and 3) engaged at its forward end by the stems of the shift keys 369, 370 is pivotally connected at its rear end with an arm 367 which is guided at its upper end by slot engagement with a shaft 365. A shoulder or arm 367 underlies a laterally bent lug of a lever 439 fast upon shaft 365, said shaft having also fast thereupon a finger 366 (Figs. 8 and 10) engaging a lug of one of the links of toggle 362. Therefore, depression of one or the other of the shift keys will rock lever 368 and shaft 365, and finger 366 will break the toggle 362. The auxiliary clutch 352 will accordingly be disengaged and the auxiliary shift clutch 353 engaged as the differential clutch mechanism 104 is selectively engaged to determine the direction of carriage shift.

Certain other controls are necessary in effecting the shifting operation, since the carriage shifting worm 358 must be freed from a normal location means when the operation is initiated, and at the end of the operation provision must be made for disengaging the differential clutch and the toggle 362 must be restored to its normal position.

To effect these operations a two phase shift control clutch 371 is provided (Figs. 6 and 9), said clutch being engaged for a partial operation upon breaking of toggle 362 and being again engaged to complete its cycle of movement upon termination of the shift. The driving element of the clutch has direct gearing connection with the motor 1, and the clutch pawl mounted upon the driven element of the clutch is normally held out of engagement with the driving element, against the bias of its spring by detent 442 (Fig. 6) engaging the pawl through a cut-away portion of the clutch housing.

When toggle 362 is broken to initiate a shift, a link 376 connected to a crank extension of one of the toggle links 362 will be moved to the right from the position shown in Figs. 8 and 10, thereby rocking a pair of bell crank levers 440, 441. Bell crank lever 441 engages the detent 442 and the movement of said bell crank will move said detent away from the clutch pawl against the tension of spring 453, thus permitting engagement of the clutch 371. An intermediately pivoted detent 373 normally rests at its lower end against the housing of clutch 371, and is provided at its upper end with an anti-friction roller normally engaging a notch of a disk 386 as shown in Fig. 6. Disk 386 is splined upon the worm shaft 379, and the engagement of the anti-friction roller of detent 373 in the notch of said disk will prevent rotation of the shifting worm 358 and will consequently hold register carriage 2 in laterally adjusted position. Upon partial rotation of clutch 371, detent 373 will be forced through the aperture of the clutch housing by a spring 450 attached to a tripping arm 381 having pin and slot connection with said detent. This movement of detent 373 will effect release of clutch 371 and will remove the anti-friction roller from the notch of disk 386, freeing worm 358 to effect lateral movement of carriage 2; this position of the parts being illustrated in Fig. 9.

The carriage will be continuously shifted until the depressed shift key 369 or 370 is released by the operator or until the carriage has been shifted into one or the other of its extreme positions. Upon release of the shift key 369 or 370, spring 452 (Fig. 2) will rock shaft 365 to provide for reengagement of clutch 371 as follows. Disk 386 is connected by a sleeve with a second disk 378 normally held toward the left as viewed in Fig. 8 against the bias of a spring by an arm 377 of link 376. Upon breaking of the toggle 362, arm 377 will be moved to the right, but disk 378 will now be engaged by an arm 383 (Fig. 9) fixed upon shaft 365 so that the disks 378 and 386 will remain held in the position illustrated in Fig. 8 until shaft 365 is rocked upon release of the shift key. When shaft 365 is rocked thereby moving arm 383 to disengaged position, these disks will move to the right and a pin 380 (Fig. 9) fixed in the disk 386 will be brought into the plane of a cam extension of tripping arm 381. As the carriage 2 is shifted into its new position by worm 358, pin 380 will contact with tripping arm 381, putting detent 373 under the tension of a spring 451 connecting the detent and tripping arm. Therefore, as the parts arrive at full cycle position, the anti-friction roller of the detent 373 will be moved into the notch of disk 386 thus rocking said detent to allow reengagement of clutch 371.

The final phase of operation of clutch 371 is adapted to effect disengagement of the clutch mechanism 104, the resetting of toggle 362 and to perform certain normalizing functions in connection with the control devices hereinafter described. The disengagement of the clutch mechanism is effected by reciprocation of stop arm 24 (Fig. 6). For this purpose, a cam 372 fast with the driven element of clutch 371 has engagement with an anti-friction roller mounted on a follower 455, said follower in turn having engagement with a shoulder of a link 424 which has connection at its forward end with arm 24. The rearward end of link 424 is attached to the lower end of a depending crank 425 fast on shaft 426 which extends across the machine (Figs. 2 and 2a). Therefore during the final operation of clutch 371, arm 24 will be reciprocated and the cam slot 144a (Figs. 6 and 7) at the rearward end of the extension 144 thereof will contact pin 145 thereby moving clutch lever 111 to its neutral position.

The aforementioned normalizing functions for the control devices (to be described) are effected by power from clutch 371 through a suitable transmission train extending across the machine to an arm 429 (Fig. 2 and 2a) as follows: Upon reciprocation of arm 24 by clutch 371, shaft 426 will be rocked in counterclockwise direction and return (Fig. 6) by link 424 and crank 425. Shaft 426 has link connection 427 (as shown in dotted lines in Figs. 2 and 2a) at the inner side of the right hand side frame with an arm 430 fixedly mounted on an inwardly extending shaft 431 which is pivotally mounted in the machine framing. Shaft 431 extends to the outer side of the side frame where arm 429 is also fixedly mounted on the shaft. When shaft 426 is rocked, linkage 427 will be effective to rock arm 430, shaft 431, and arm 429 in counterclockwise direction and return (Figs. 2 and 2a).

The toggle 362 will be reset during the final operation of clutch 371 by means of a cam 391 (Fig. 6) fast on the driven element of said clutch. Cam 391 engages an anti-friction roller mounted on the bell crank lever 441 whereby bell crank lever 440, link 376 and toggle links 362 will be positively returned to normal position and thereby allow detent 442 to be spring urged to engage the clutch pawl of clutch 371 and disengage said clutch.

Should the right shift key or left shift key 370 be held depressed until the carriage is shifted into either of its extreme positions, shift initiation shaft 365 will be restored to normal whereby the drive is terminated in the same manner as described when shaft 365 is restored to normal by release of a shift key. For this purpose, two lugs 460 (Figs. 2 and 6) are located on the rear of the carriage and so spaced that the nose of a plunger 438 mounted on arm 367 is positioned just below one or the other of said lugs respectively when the carriage is in one or the other of its extreme positions. Should the carriage be in the extreme right hand position, for example, and the left shift key 370 depressed, the plunger which is spring urged to its normal position will be depressed by contact with the leftmost lug 460 when the arm 367 is raised and the shift initiated. When the carriage is shifted from the extreme right hand position, the lug 460 will be removed from contact with the plunger 438 and said plunger will be spring urged to its extended position. As the carriage is shifted into the extreme left hand position, the side of the nose of the plunger 438 will contact the rightmost lug 460 thereby moving the plunger and arm 367 toward the rear of the machine against the tension of spring 367a. This movement of arm 367 will remove the shoulder thereof from restraining engagement with lever 439 allowing said lever and shaft 365 to be spring urged counterclockwise to normal and thus terminate the shift. When the shift key is finally released, the plunger 438 will drop below lug 460 and arm 367 will be urged forward by its spring thus locating the shoulder thereof in normal engagement with lever 439.

*Carriage position operation control means*

The control means comprise an adjustable lever device (Figs. 2, 2a, and 3) which, if the carriage is out of its leftmost position, is operable upon depression of key 526 to depress the left shift key 370 and to restrain arm 567 thereby holding the operation of the spring energized set-up initiating mechanism in abeyance. In response to the termination of the carriage shift in the leftmost position, the control device is restored to ineffective position thereby permitting operation of the restrained spring energized mechanism and the restoration of the left shift key to normal. If, however, the carriage is in its leftmost position, the device will be so adjusted as to render it inoperative upon depression of key 526 and the set-up operation will be initiated forthwith as hereinbefore described.

The control device comprises a member 762 (Figs. 2, 2a and 3) which is pivotally supported at the end of a leftwardly extending arm of a bell crank lever 763. Bell crank lever 763 is pivotally mounted on a fixed stud on the framing of the machine and the depending arm thereof is adapted for engagement by a pin 765 on arm 429. Member 762 overlies a pin 766 in the stem of left shift key 370 and a downwardly extending leg 762a of said member is provided with an open end slot which engages pin 368a at the end of the leftwardly extending arm of lever 368. Member 762 is further provided with a rightwardly extending arm 762b, the free end of which is normally positioned above and to the left of and (Fig. 2) out of the path of movement of the end of lever 567. An adjustable slide 767 is provided with pin and slot mounting 768 on member 762 and at its leftmost end is provided with an upstanding shoulder 767a which is adapted for engagement by a pin 769 on the stem of operation key 526. Slide 767 is urged by spring 770 toward the right (Fig. 3) whereby the shoulder 767a thereof may be moved below and into the path of movement of pin 769 and thus into operating relationship with key 526. Slide 767 is further provided with an upstanding finger 767b whereby said slide may be moved toward the left against the tension of spring 770 and thus position shoulder 767a out of the path of movement of pin 769 (Figs. 2 and 2a). The control device comprising member 762, lever 763 and slide 767 are held in normal raised position (Figs. 2 and 2a) by means of a toggle spring 771 attached to arm 762b and to a pin on the framing of the machine; the upward movement being limited by contact of member 762 with the key plate of the machine.

When carriage 2 is in its leftmost position, slide 767 will be adjusted to the position shown in Figs. 2 and 2a in which position shoulder 767a will be to the left and out of the path of movement of pin 769 on the stem of key 526. Therefore, upon depression of key 526 the set-up operation will be immediately initiated as heretobefore described. The adjustment of slide 767 out of operating relationship with key 526 is effected as follows:

A lever 548 (Figs. 2, 2a, and 4) is pivotally mounted intermediate its ends of the underside of an extension of the key plate laterally of the right hand side frame. When carriage 2 is shifted into its leftmost position, a lug 547 on said carriage will contact the rearward end of lever 548 thus rocking said lever in counterclockwise direction (Fig. 4) against the bias of a spring at its forward end. Lever 548 is provided at its forward end with a depending pin 772 which is in registration with a cam slot in an arm 773 which is also pivotally mounted on the under side of the key plate. Arm 773 is provided at its free end with a depending lug 773a which is in contact with the finger 767b of slide 767. Therefore when lever 548 is rocked in counterclockwise direction (Fig. 4), arm 773 will be rocked in clockwise direction and lug 773a will move slide 767 to the left against the tension of spring 770 and thereby position shoulder 767a out of the path of movement of pin 769 on the stem of key 526.

It will be obvious from the foregoing description that when carriage 2 is shifted out of its leftmost position, lug 547 removed from contact with lever 548 will permit clockwise movement (Fig. 4) of said lever by its spring and in consequence arm 773 will be moved in counterclockwise direction thereby allowing slide 767 to be moved to the right by spring 770. Shoulder 767a will accordingly be positioned into the path of movement of pin 769 (Fig. 3) on the stem of operation key 526. When carriage 2 is positioned out of its leftmost position the single depression of operation key 526 will effect a shift of the carriage to its leftmost position followed by the previously described set-up operation as follows:

Upon depression of key 526, pin 769 will engage shoulder 767a (Fig. 3) thereby rocking slide 767, member 762 and bell crank 763 as a unit in counterclockwise direction about the pivot 764 of said bell crank. The left shift key 370 will therefore be depressed by member 762 in contact with pin 766 on the stem of said shift key. Lever 368 will therefore be rocked to initiate the shift, the movement being assisted by the leg 762a of member 762. Furthermore in the above-described movement of the lever system and prior to the engagement of the lower link of toggle 552 by trip member 551 to release the spring energized mechanism, the free end of arm 762b will be moved downwardly to the left (Fig. 3) of the end of lever 567. Therefore, when toggle 552 is broken and cam 561 rotated by the spring charged lever 553, the operation of lever 564 will be held in abeyance by yielding movement thereof; lever 567 being blocked from movement by arm 762b (Fig. 3). Such yielding movement is allowed by the movement of arm 563 on which lever 564 is mounted as follows. It will be recalled that the nose at the upper end of arm 564 is held against cam 562 by spring 565 thereby normally locating the pivotal point of lever 564 in fixed position. Therefore when the lower end of lever 564 is blocked from movement by arm 762b, cam 561 will move the upper end of said lever toward the right (Fig. 3) and arm 563 will be rocked in clockwise direction thereby moving the pivotal point of lever 564 and adding tension to spring 565.

Upon release of operation key 526 the lever system will be held in effective position by toggle spring 771 thus holding the left shift key 370 depressed and the operation of the set-up mechanism in abeyance until the carriage shift has been terminated in the leftmost position and arm 429 (Fig. 2) rocked in consequence as heretofore described. Upon movement of the carriage into the leftmost position slide 767 will be adjusted out of engagement with pin 769 of key 526. Therefore should key 526 be held depressed until the termination of the shift, the devices will not be prevented from movement to normal which is effected by pin 765 on arm 429 as follows: Normally the depending arm 763a of bell crank 763 is out of the path of movement of pin 765 (Figs. 2 and 2a). However when bell crank 763 is rocked upon initiation of the operation, the depending arm 763a thereof is brought into the path of movement of pin 765 (Fig. 3). Accordingly, when arm 429 is rocked, pin 765 will engage the depending arm of bell crank 763 thus rocking said crank, member 762 and slide 767 to the normal position shown in Figs. 2 and 2a, thereby releasing left shift key 370 and removing arm 762b from engagement with lever 567. Spring 565 will now be effective to move arm 563 counterclockwise to normal position and consequently lever 564 pivoted thereon will be rocked in clockwise direction and lever 567 in clockwise direction (Fig. 4) to move clutch lever 111 to clutch engaging position and thereby initiate the set-up operation.

It will be noted that slide 767 is provided with a depending arm 767c which is adjusted into the path of movement of pin 765 (Fig. 3). Arm 767c is non-essential to the operation of the devices as described in the foregoing. However, should the machine be provided with tabulating mechanism, for example such as fully disclosed in my co-pending application Serial No. 8,544 (now Patent 2,531,204), the leftward carriage shift would be terminated short of the leftmost position should the tabulating mechanism be so set. In such case, slide 767 would not be removed from engagement with pin 769 on operating key 526 upon termination of the shift if said key is held depressed. Pin 765 on arm 429 will therefore be effective to move slide 767 to permit normalization of the devices. Furthermore it will be noted with reference to my co-pending application Serial No. 8,547 (now Patent 2,531,206), that a set-up operation effected with carriage 2 displaced from its leftmost position will cause the values set on keys 18 to be registered as a dividend in product-dividend wheels 13 (Fig. 1).

Although I have shown and described the carriage position control means in conjunction with a specific clutch driven operation, it will be understood that the invention is equally applicable to the control of other clutch driven operations in machines of the class described. Also it will be apparent that the drive for shifting the carriage and for effecting the controlled operation may be transmitted from the motor by separate clutches and power trains. It will be further understood therefore that the invention is not to be limited to use in machines employing the specific type of carriage shifting mechanism herein described nor in which the power to drive the shifting mechanism and for effecting the particular operation performed is delivered through a common clutch mechanism.

I claim:

1. Operation control means for a motor driven calculating machine having a shiftable register carriage, mechanism for denominationally shifting said carriage including a member movable to initiate the operation, means operable upon movement of said carriage into a given position to terminate operation of said carriage shifting mechanism and a clutch mechanism; said control means comprising a clutch control member movable to control the engagement of said clutch mechanism, spring energized mechanism operable to move said clutch control member to clutch engaging position, an operating member movable to initiate operation of said spring energized mechanism, a restraining device adjustable into operating relationship with said operating member; said device thereupon being movable upon initiating movement of said operating member into position to restrain said clutch control member and thereby hold the operation of said spring energized mechanism in abeyance, a member operable upon movement of said carriage into or out of said shift terminating position to adjust said restraining device out of or into operating relationship respectively with said operating member, and drive means operable in response to movement of said carriage into said shift terminating position to move said device from restraining position.

2. Operation control means for a motor driven calculating machine according to claim 1 wherein the carriage shift terminating means includes the drive means operable to move the device from restraining position.

3. Operation control means for a motor driven calculating machine having a shiftable register carriage, mechanism for denominationally shifting said carriage including a shift control member movable to initiate the operation, means operable upon movement of said carriage into a given position to terminate operation of said carriage shifting mechanism, and a clutch mechanism; said control means comprising a clutch control member movable to control the engagement of said clutch mechanism, spring energized mechanism operable to move said clutch control member to clutch engaging position, an operating member movable to initiate operation of said spring energized mechanism, a device adjustable into operating relationship with said operating member; said device thereupon being operable upon said initiating movement of said operating member to move said shift control member to shift initiating position and in said operation movable into position to restrain said clutch control member, thereby holding the operation of said spring energized mechanism in abeyance, a member operable upon movement of said carriage into or out of said shift terminating position to adjust said device out of or into operating relationship respectively with said operating member, and drive means operable in response to movement of said carriage into said shift terminating position to move said device from restraining position.

4. Operation control means for a motor driven calculating machine according to claim 3 wherein the carriage shift terminating means includes the drive means operable to move the device from restraining position.

5. Operation control means for a motor driven calculating machine having a shiftable register carriage, mechanism for denominationally shifting said carriage and a clutch mechanism; said control means comprising a driving train for said shifting mechanism including an element adjustable into or out of driven relationship with said clutch mechanism, a first clutch control member movable to control the engagement of said clutch mechanism, a second clutch control member operable to cause engagement of said clutch mechanism and to adjust said element of said drive train into driven relationship with said clutch mechanism, spring energized mechanism operable to move said first clutch control member to clutch engaging position, an operating member movable to initiate operation of said spring energized mechanism, a restraining device adjustable into operating relationship with said operating member; said device thereupon being movable upon initiating movement of said operating member to operate said second clutch control member and to position said device to restrain said first clutch control member and thereby hold the operation of said spring energized mechanism in abeyance, a member operable upon movement of said carriage into or out of a given position to adjust said restraining device out of or into operating relationship respectively with said operating member, shift terminating means operable to disengage said clutch mechanism in response to movement of said carriage into a given position and drive means operable upon movement of said carriage into said shift terminating position to adjust said element of said shift drive train out of driven relationship with said clutch mechanism and to move said device from restraining position.

6. Operation control means for a motor driven calculating machine according to claim 5 wherein the shift terminating means comprises the drive means operable to adjust the element of the shift drive train out of driven relationship with the clutch mechanism and to move the device from restraining position.

7. Operation control means for a motor driven calculating machine according to claim 5 characterized by the provision of a second driving train including an element adjustable out of or into driven relationship with the clutch mechanism upon adjustment of the element of the shifting mechanism drive train into or out of driven relationship respectively with said clutch mechanism.

8. Operation control means for a motor driven calculating machine according to claim 7 wherein the shift terminating means comprises the drive means operable to adjust the element of the shifting mechanism drive train out of driven relationship with the clutch mechanism and to move the device from restraining position.

9. Operation control means for a motor driven calculating machine having a shiftable carriage, mechanism for shifting said carriage into a plurality of positions, a shift control train movable to operative position to initiate and maintain operation of said shifting mechanism; said control train including an element adjustable to render said train ineffective to maintain operation of said shifting mechanism, and a clutch mechanism; said means comprising a clutch control member movable to control the engagement of said clutch mechanism, spring energized mechanism operable to move said clutch control member to clutch engaging position, an operating member movable to initiate operation of said spring energized mechanism, a restraining device adjustable into operating relationship with said operating member; said device thereupon being movable upon initiating movement of said operating member to move said shift control train to operative position and to position said device to restrain said clutch control member and thereby hold the operation of said spring energized mechanism in abeyance, a member operable upon movement of said carriage into or out of a given position to adjust said device out of or into operating relationship respectively with said operating member, shift terminating mechanism including means operable upon movement of said carriage into a given position to adjust said element of said shift control train to render said train ineffective to maintain operation of said shifting mechanism and means operable in response to the adjustment of said shift train element to move said device from restraining position.

10. Operation control means for a motor driven calculating machine according to claim 9 wherein the means operable to move the device from restraining position comprises a power transmission and drive means therefor.

11. Operation control means for a motor driven calculating machine according to claim 10 wherein the shift terminating mechanism includes the drive means.

HERMAN GANG.

REFERENCES CITED

The following references are of record in the file of this patent:

UNITED STATES PATENTS

| Number | Name | Date |
|---|---|---|
| 2,294,948 | Avery | Sept. 8, 1942 |
| 2,329,649 | Pinyan | Sept. 14, 1943 |
| 2,365,324 | Avery | Dec. 19, 1944 |
| 2,377,767 | Dustin | June 5, 1945 |
| 2,419,760 | Britten | Apr. 29, 1947 |